United States Patent [19]
Specht

[11] Patent Number: 5,938,233
[45] Date of Patent: *Aug. 17, 1999

[54] AIR BAG DEVICE

[75] Inventor: Martin Specht, Feldafing, Germany

[73] Assignee: Becker Group Europe GmbH, Wuppertal, Germany

[*] Notice: This patent is subject to a terminal disclaimer.

[21] Appl. No.: 09/083,472

[22] Filed: May 22, 1998

Related U.S. Application Data

[63] Continuation of application No. 08/565,551, Nov. 30, 1995, Pat. No. 5,755,457.

[51] Int. Cl.⁶ .................................................. B60R 21/22
[52] U.S. Cl. ........................................ 280/730.2; 280/740
[58] Field of Search .............................. 280/730.2, 730.1, 280/729, 728.2, 740, 743.1, 728.1, 732

[56] References Cited

U.S. PATENT DOCUMENTS

| | | | |
|---|---|---|---|
| 3,733,088 | 5/1973 | Stephenson | 280/730.1 |
| 3,799,573 | 3/1974 | McDonald | 280/740 |
| 3,897,961 | 8/1975 | Leising et al. | 280/730.1 |
| 5,094,475 | 3/1992 | Olsson et al. | 280/730.2 |
| 5,322,322 | 6/1994 | Bark et al. | 280/730.2 |
| 5,462,308 | 10/1995 | Seki et al. | 280/730.2 |
| 5,540,459 | 7/1996 | Daniel | 280/730.2 |
| 5,588,672 | 12/1996 | Karlow et al. | 280/730.2 |

FOREIGN PATENT DOCUMENTS

| | | | |
|---|---|---|---|
| 3-276844 | 12/1991 | Japan | 280/730.2 |
| 6-227340 | 8/1994 | Japan . | |
| 2191450 | 12/1987 | United Kingdom | 280/730.1 |

*Primary Examiner*—Peter C. English
*Attorney, Agent, or Firm*—Harness, Dickey & Pierce, P.L.C.

[57] ABSTRACT

An air bag unit is provided to protect a vehicle passenger from impacting a member of the interior of a vehicle. The air bag unit includes one or more air bags attached as an integral unit to a clamping device for attachment to a portion of the interior vehicle frame. Since the air bag is intended to protect passengers from impact with an interior member of the vehicle frame, the air bag is adapted to the shape of such member. The clamping device includes an attachment part which slidably engages the interior of the vehicle frame. In addition, the air bag unit is inflated by a tube housed therein. The tube exerts a restraining action on the inflating gas and includes one or more breakage locations which are intended to rupture within the air bag at a predetermined pressure for inflation of the air bag.

11 Claims, 6 Drawing Sheets

AIR BAG DEVICE

This application is a continuation of application Ser. No. 08/565,551, filed on Nov. 30, 1995, issued as U.S. Pat. No. 5,755,457, hereby incorporated herein by reference.

BACKGROUND OF THE INVENTION

The present invention relates to an air bag device which protects the passengers of vehicles, in particular, from head injuries caused by impact with parts of the vehicle frame.

SUMMARY OF THE INVENTION

In accordance with the invention, this object is achieved by having one or more air bags arranged along a corresponding frame part of the vehicle and fastened there by a clamping device.

It is advantageous if the clamping device and the air bag form a single structural unit and are fastened jointly upon mounting. By means of the clamping device, the air bag, which is suitably adapted in its shape to the frame part, can easily be fastened along the frame part, or subsequently attached.

The air bag is preferably of tubular shape. Its size can be such that all parts of the vehicle frame that could be impacted by a passenger are covered, and that in the event of a collision the direct contact of the frame parts by the passenger is prevented.

The speed of deployment and the response are substantially improved by the use of several gas-producing devices which are distributed along the air bag. In the case of a tubular air bag, the inflation can take place at the two ends of the tube.

A preferred means for producing the inflating gas comprises a blast cord arranged parallel to the air bag. Moreover, in order further to improve the response behavior, the firing can take place at the two ends of the cord. With the use of sufficiently intelligent sensors and/or electronic devices, the firing or inflation can start on the side of the air bag which is positioned relative to the direction in which the fastest inflation acceleration occurs.

A further improvement can be obtained if the production of gas and the obtainable breaking strength of the material of the air bag are so adapted to each other that the blast cord, which is possibly surrounded by a calming agent, is contained in the air bag and the gas liberated upon the firing can inflate the air bag directly without additional feed devices.

The material for an air bag may be known elastic impact-absorbing plastics which retain their properties even at higher temperatures and are not flammable.

For the firing of the air bag or air bags, covered "stupins" can preferably be used as firing cord.

In addition to the variant already described of including the blast cord in the air bag, it is also possible to provide gas leads on the frame parts on which the air bag is fastened. The gas can pass from the gas generator into the air bag through these leads.

The air bag, which particularly has an elongated shape, for instance a tubular shape, can extend along the upper part of the door frame, particularly on the two front doors, but also on the two rear doors of the body of a motor vehicle. In order to produce the inflation pressure within the air bag, a tube adapted to the shape of the door frame part and in which an inflation gas with a given pressure is produced can be arranged inside the air bag. The tube is preferably developed so that a restraining action is first exerted on the inflation gas produced. Then, after the inflation gas has built up a certain pressure within the inside of the tube, the tube opens into the inside of the air bag. This can be achieved, for instance, by providing one or more places of intended breakage in the wall of the tube.

In order to form an air bag unit, two longitudinal edges of the air bag fabric covering are sewn to the tube in seams that extend along the longitudinal direction of the tube. For this purpose, the tube has a projection in the form of a sewing fold which extends in the longitudinal direction of the tube. In order to permit sewing to the outer fabric of the air bag, the sewing fold can be comprised of a softer material than the material of the tube which produces the restraining action. The tube and the sewing fold formed thereon can be produced as an endless part of plastic, in particular of two plastic components.

In order to produce the inflation pressure required, gas generators such as selenium burners can be provided at the two ends of the tube in order to obtain rapid burning.

For anchoring the air bag unit, which includes the folded air bag and the tube, mechanical attachment means are provided. For instance, they are in the form of holding clamps or holding plates which are inserted in form-locked manner at the place of attachment of the clamping device on the vehicle body between an attachment part on the clamping device and an associated attachment part on the body of the vehicle.

The mechanical holding part or parts in the form of holding plates or holding clamps are preferably connected to the air bag unit in the region of the sewing fold. They can be sewn together there or can be embedded in the sewing fold or be pressed from the outside on the sewing fold which is sewn to the outer fabric of the air bag.

Other features and advantages of the present invention will become apparent from the following description of the invention which refers to the accompanying drawings.

BRIEF DESCRIPTION OF THE DRAWINGS

FIG. 9 is a view of a first embodiment for the attachment of a mechanical holding part to the air bag unit;

FIG. 10 is a view of a second embodiment of the attachment of a mechanical holding part to the air bag unit;

FIGS. 11 A and B are embodiments of the attachment of the holding part to the air bag unit; and FIG. 12 is an embodiment of an air bag unit ready for installation.

DETAILED DESCRIPTION OF EMBODIMENTS OF THE INVENTION

Figure 1:
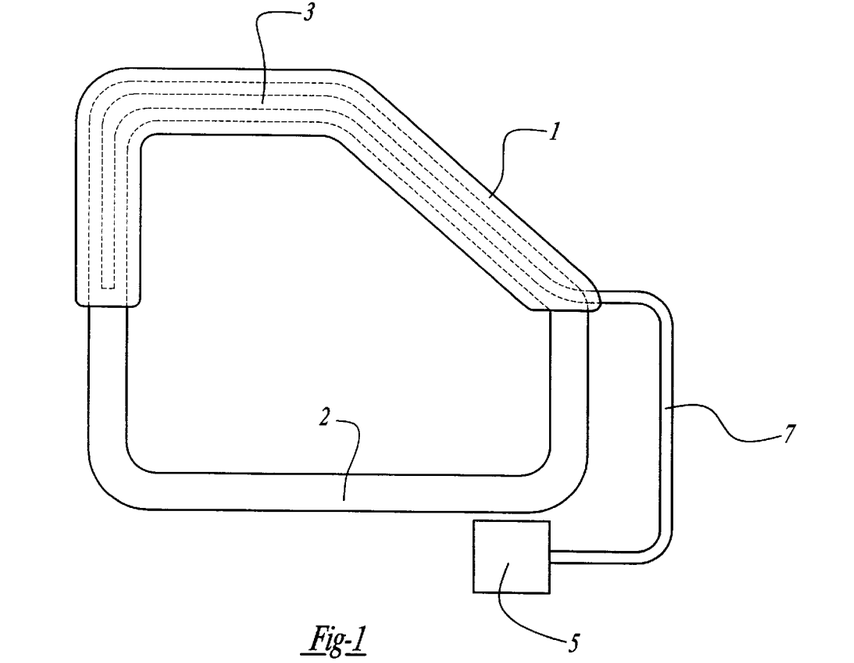
FIG. 1 is a diagrammatic view of a first embodiment of an air bag device of the present invention on the frame of a vehicle door.

FIG. 1 shows an air bag device to serve as impact protection on a door frame of a vehicle door. On a frame 2 of the door, in the region where a passenger may impact the door, an air bag 1 is arranged, which is inflated as shown in FIG. 1. Instead of the one-piece air bag, several air bags 1 can also tentatively be used, arranged alongside each other and each having an associated gas generator.

The firing of the gas generator or generators is effected by response of a sensor 5.

In the embodiment shown in FIG. 1, a blast cord 3 is arranged as a gas generator along the impact potential region of the frame 2 and extending substantially parallel to the tubular air bag 1. The blast cord is fired by a firing cord 7. The firing cord 7 can be developed as covered "stupins". The blast cord 3 can also be fired at both its ends by two firing cords 7.

Figure 2:
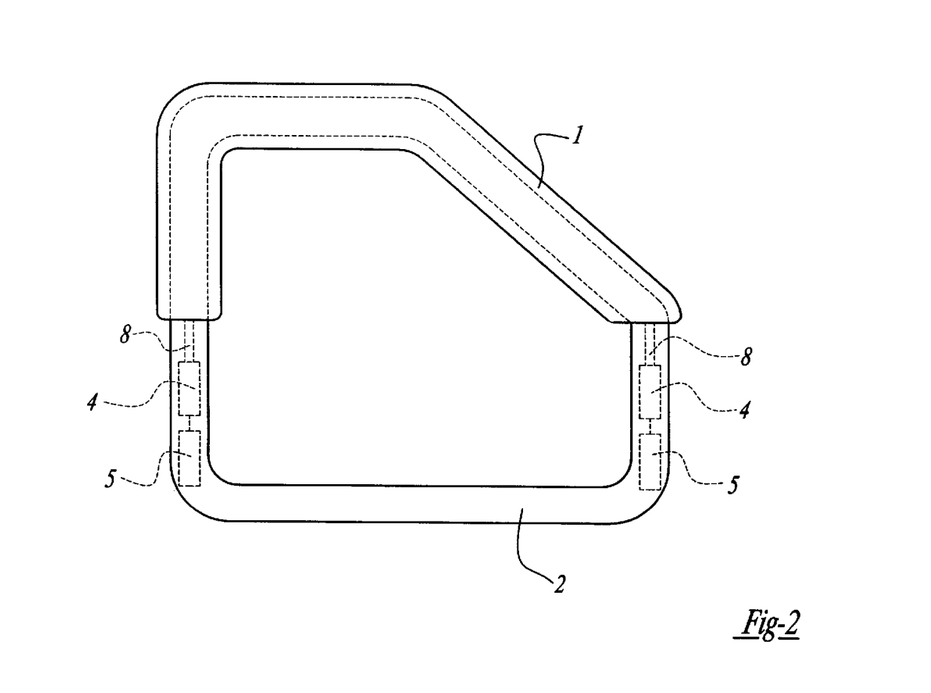
FIG. 2 is a view of a second embodiment of the present invention.

For the production of the gas however, instead of using the blast cord 3, it is also possible to use a traditional gas generator 4 which is also fired in a known manner by means of the sensor 5 (FIG. 2). Through a gas feed 8, which is placed along the frame 2, the inflation gas is fed to the air bag 1. Gas generators 4 for inflation can also be provided at both ends of the air bag 1.

Figure 3:
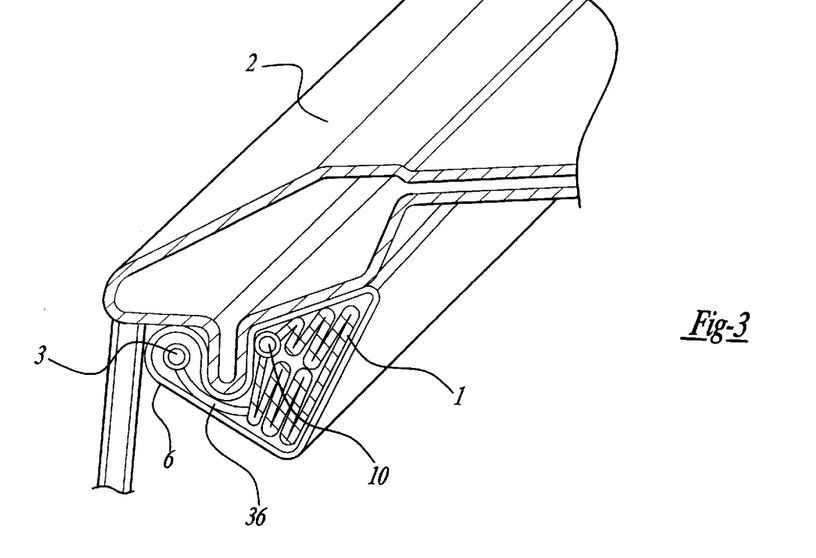
FIG. 3 is a sectional view through a first variant of the embodiment in FIG. 1.

FIG. 3 shows one possible attachment of the air bag 1 to the frame 2 by a clamping device 6 which clamps firmly onto the frame 2. The uninflated air bag 1 is covered, for aesthetic reasons, on its surface facing the inside of the vehicle. The gas lead 36 is provided between the blast cord 3 and the folded air bag 1. The emergence of the gas into the air bag 1 is effected by a diffuser 10.

Figure 4:
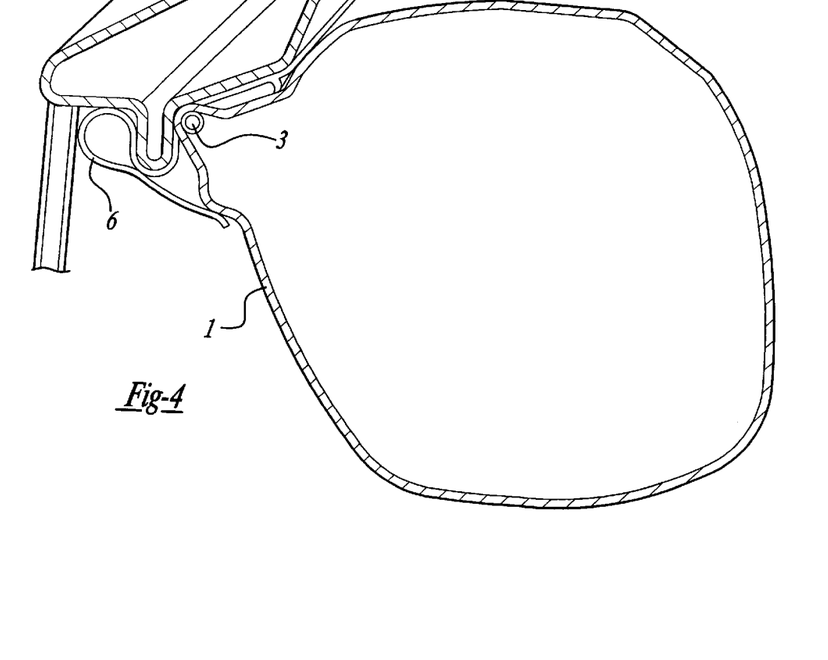
FIG. 4 is a sectional view through a second variant of the embodiment in FIG. 1.

An inflated air bag 1 on the frame 2 of a vehicle door is shown in FIG. 4. It is attached by a clamping device 6 in the same manner as for the embodiment in FIG. 3. The gas generator in the form of a blast cord 3 is present in this embodiment within the air bag. The blast cord 3 can be surrounded by an agent which reduces the shattering power (calming cover) of a material such as described, for instance, in EP 585 612 A3.

Figure 5:
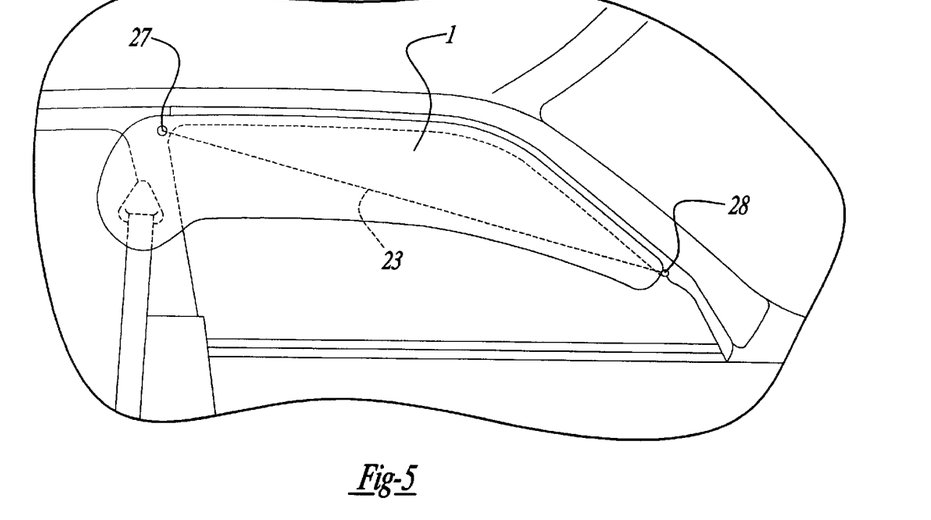
FIG. 5 is a side view of a further embodiment of an inflated air bag.

In the embodiment of an air bag 1 shown in FIG. 5, which is shown in inflated condition, a stabilizing cord 23 formed of a rope of high tear strength extends in the lower part of the inflated outer fabric of the filled air bag, particularly in the region of the bend. The stabilizing cord 23 is sewn to the outer fabric of the air bag 1. In particular, when the window in the vehicle door is shattered or opened in the event of an accident, additional stabilizing of the air bag when it absorbs the impact of the head of the passenger is provided by the stabilizing cord 23. The stabilizing cord is anchored at locations 27 and 28 on the body of the vehicle, for instance on the A and B column for an air bag arranged in the region of the front door of the motor vehicle.

Figure 8:
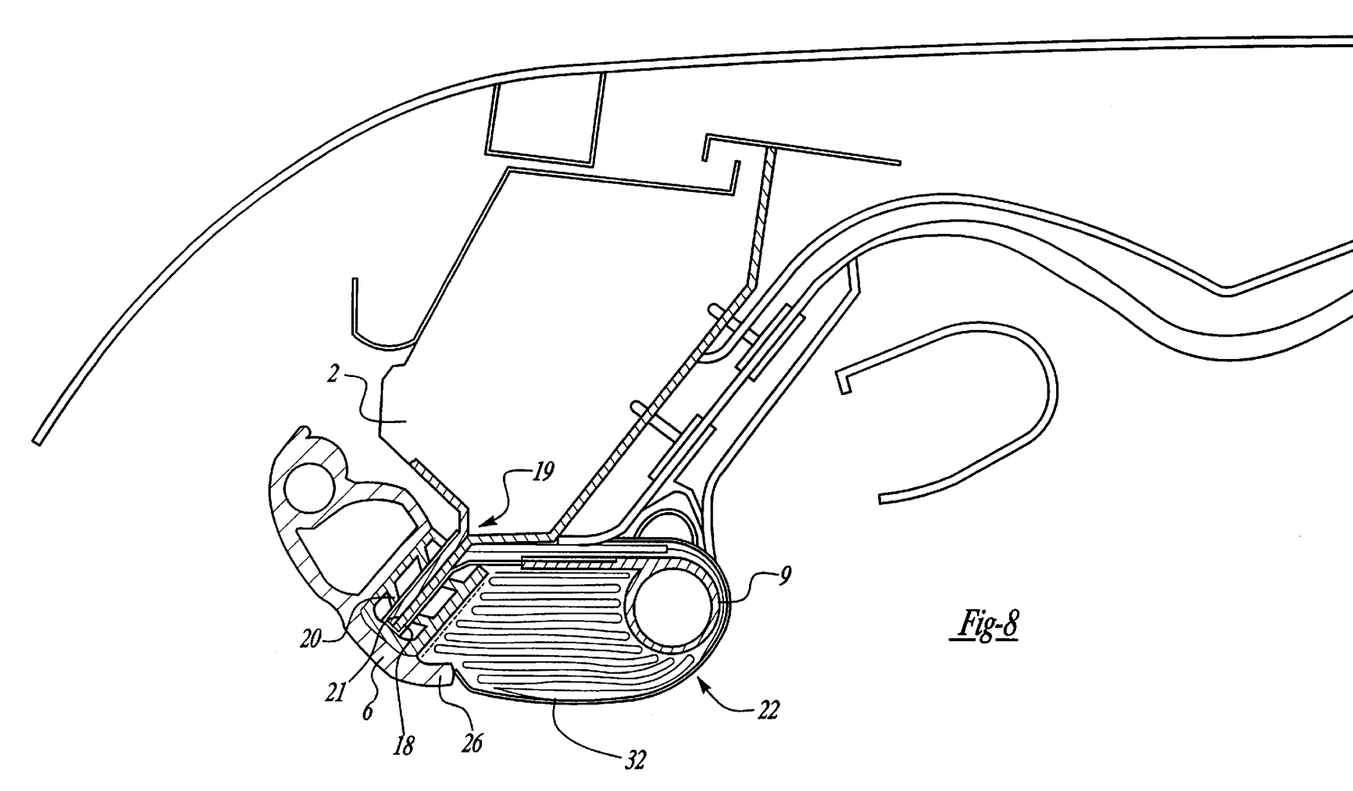
FIG. 8 is a side view of a second embodiment of the installation of an air bag unit combined with the clamping device which is attached to a part of the body.
Figures 9, 10, 11A, 11B, 12:
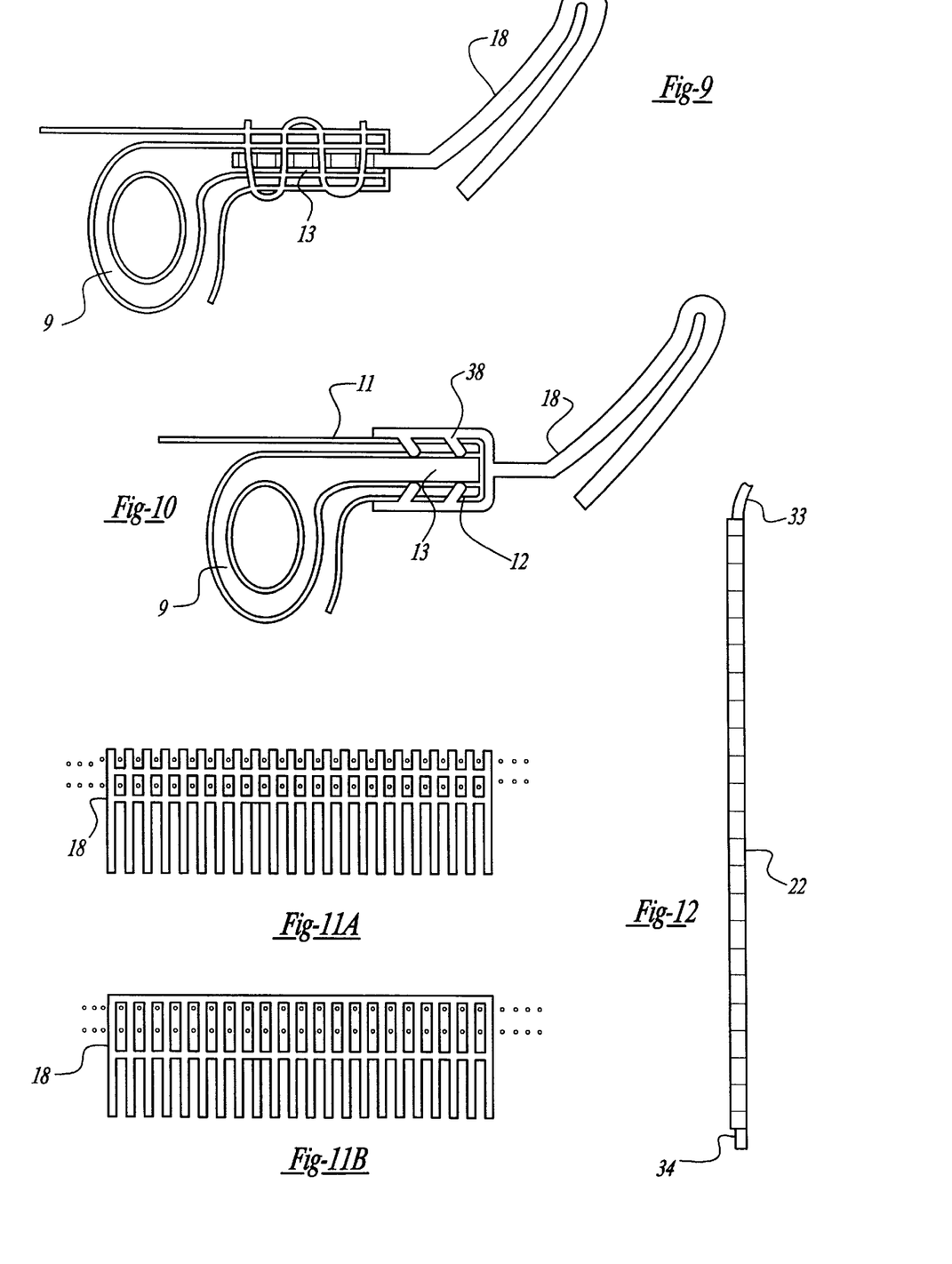

In its folded condition, the air bag may have an elongated shape, in particular a tubular shape, as shown in FIG. 12. Upon installation in the body of the vehicle, the air bag 1 extends along the part of the body which in the case of a vehicle door is preferably the upper frame part of the door, as seen in FIGS. 1, 2 and 5. The air bag 1 is part of an air bag unit 22, embodiments of which are shown in FIGS. 6 to 10. Protruding ends 33, 34 of the stabilizing cord 23 are anchored on the body of the vehicle.

The air bag unit 22 of the corresponding embodiment has a tube 9 which is formed as an endless part from a flexible material, in particular a plastic material. The tube 9 is made from a material which exerts a restraining action on the pressure of the inflation gas produced in the tube 9. This restraining action assures that upon the firing of the propellant charge which produces the inflation gas, a predetermined pressure of inflation gas is built up within the tube 9. When this predetermined pressure has been reached, one or more intended breakage points 24 in the wall of the tube 9 open up. The pressure of the inflation gas then fills the air bag 1.

Figure 6:
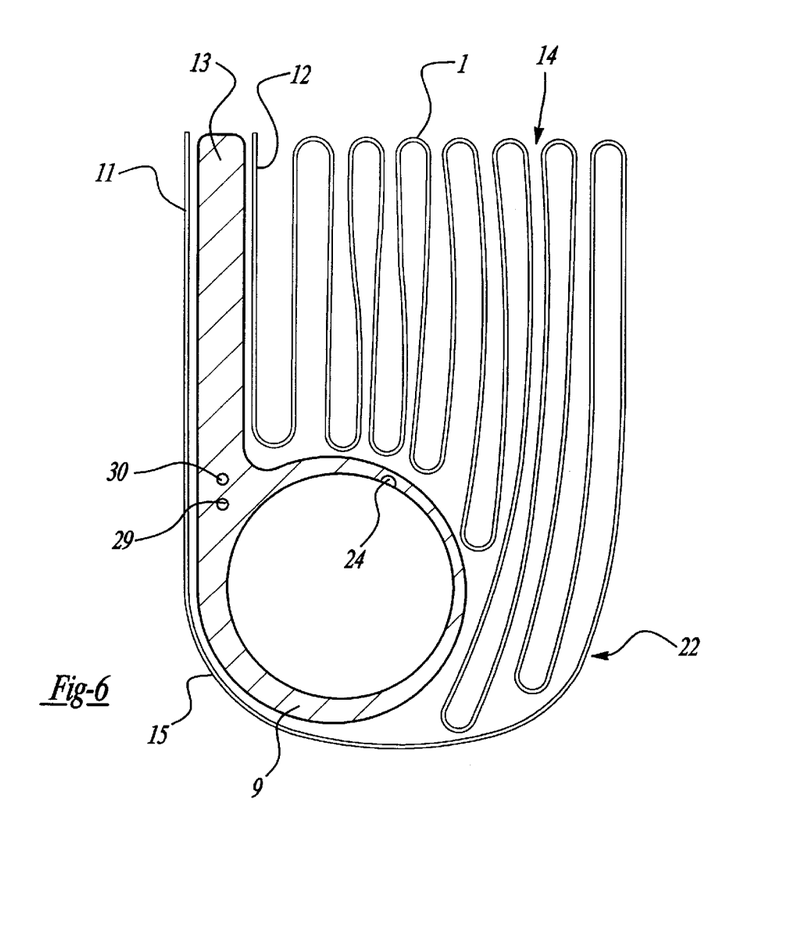
FIG. 6 is a side view of an air bag unit comprised of a tube and folded air bag outer fabric.

Referring to FIG. 6, the air bag outer fabric is folded, as shown by the folds 14. The folds 14 extend parallel to the tube 9 and over the length of the tube. An outer fold 15 of the air bag outer fabric is placed around the package comprised of the folded air bag 1 and around the tube 9. At its lower edge 11, the outer fold 15 of the air bag outer fabric is sewn to the tube 9 in the region of a sewing fold 13 which is formed thereon. Furthermore, an inner longitudinal edge 12 of an inner fold of the foldings 14 is sewn to the sewing fold 13. In this way, the tube 9 is closed inside of the air bag. The sewing fold 13 may be comprised of a softer material than the tube 9, so that it is possible to sew it to the two longitudinal edges 11 and 12 of the outer fabric of the air bag 1. The sewing of the outer fabric of the air bag along the longitudinal edges 11 and 12 is effected on both sides of the sewing fold 13.

To generate an inflation pressure, gas generators are provided at both ends of the tube 9. These generators may be selenium burners which rapidly burn a propellant charge to generate sufficient gas pressure. After overcoming the restraining action exerted by the tube 9, the breakage location 24 of the tube 9 opens up into the inside of the air bag so that the wall of the air bag is inflated. The breakage location 24 can be a notch which expands in length along tube 9.

The firing of the two gas generators can be effected electrically via electric feed lines 29 and 30 which are embedded in the tube 9.

Figure 7:
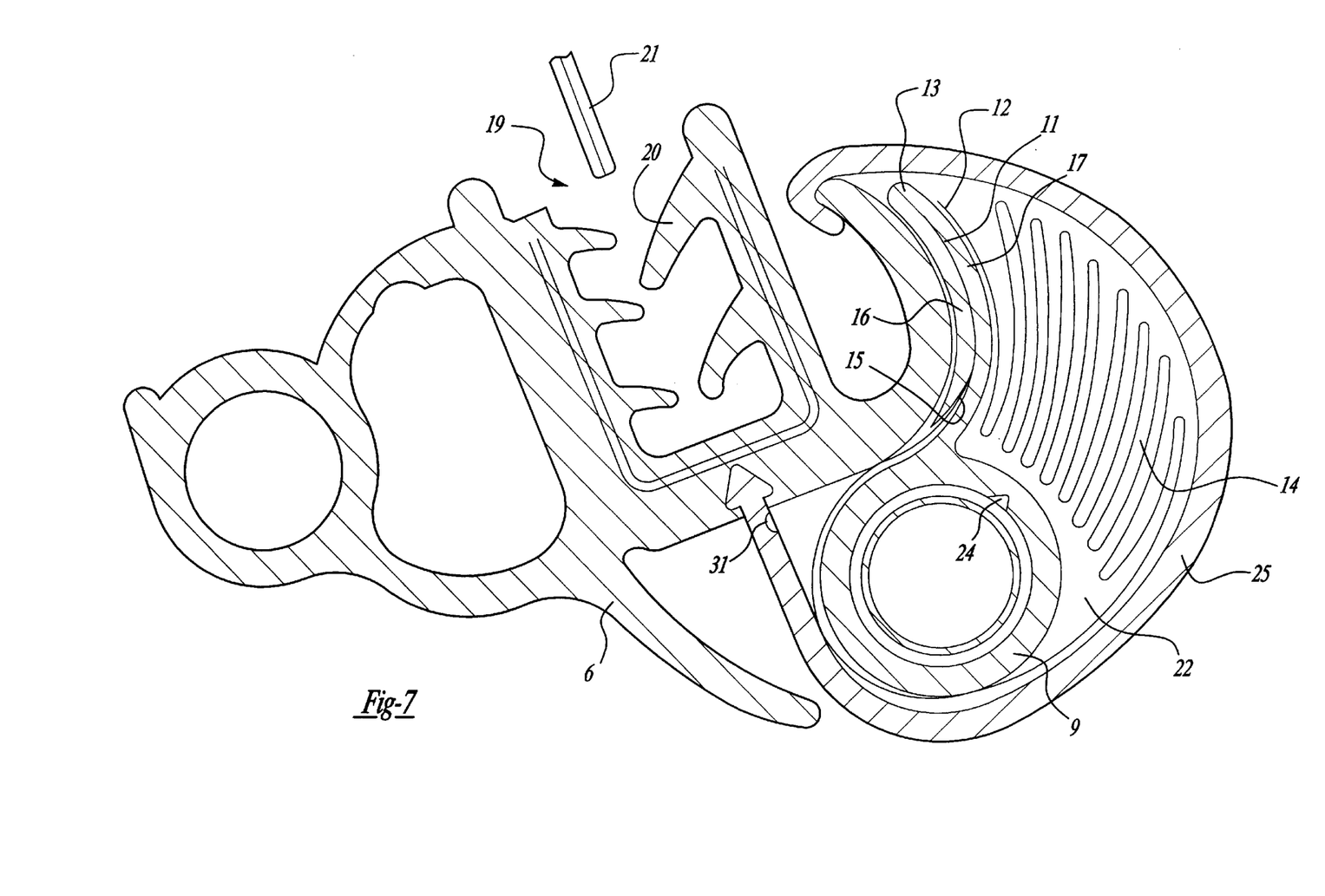
FIG. 7 is a side view of a first embodiment of the installation of the air bag unit, combined with a clamping device adapted to be attached to the body of the vehicle.

FIG. 7 is an embodiment of the clamping device 6 for installing the air bag unit 22 to the frame of the vehicle. In this embodiment, the sewing fold 13 is folded-over. The folded-over sewing fold 13 includes two sewing fold portions 16 and 17, namely an outer sewing fold portion 16 and an inner sewing fold portion 17. The longitudinal edge 11 of the outer fold 15 of the air bag outer fabric is contained between the two sewing fold portions 16 and 17 (FIG. 7). In this way, bonding of the air bag unit 22 to the plastic material of the clamping device 6 is possible, since the outer fabric of the air bag, which normally consists of non-adhesive material (nylon fabric), is covered by the outer sewing fold portion 16. The outer sewing fold portion 16 can then be bonded to the material of the clamping device 6. The sewing is effected with the outer sewing fold portion 16 folded-over, so that the longitudinal edge 11 of the outer fold 15 is held between the two sewing fold portions 16 and 17, and the longitudinal edge 12 of the inner fold rests against the sewing fold portion 17.

In the embodiment shown in FIG. 7, for additional support of the air bag unit 22, a covering 25 can also be provided on the longitudinal section of the clamping device 6. For the installation, the covering 25 then remains only in the region in which the air bag unit is provided. On the remaining part of the longitudinal section of the clamping device 6, the excess material of the covering 25 can be removed, for instance by means of a weak point 31 at the transition between the covering 25 and the material of the clamping device 6. The covering material can be so developed that it yields under the inflation pressure upon inflation of the air bag, so that the air bag can spread out into the inside of the vehicle.

The combination of clamping device 6 and air bag unit 22 can then be attached to the body of the vehicle at an attachment location 19 on the body of the vehicle. The attachment of the air bag to attachment location 19 is by mating an attachment part 20 of clamping device 6 and an attachment part 21 associated with the body of the vehicle. A clamping connection on the place of attachment 19 of the clamping device is formed by the attachment parts 20 and 21.

In the embodiment shown in FIG. 8, the attachment of the air bag unit 22 is effected by one or more holding parts 18 which are firmly attached to the air bag unit 22 and are inserted in form-locked manner at the attachment location 19 of the clamping device between the attachment part 20 of the clamping device and the attachment part 21 on the vehicle body. A mechanical holding part 18 which is adapted in shape to the attachment parts 20 and 21 can be provided, for example, in the form of a holding plate. In order to make the holding plate flexible, it can be made in the form of a fence or comb, as shown in FIGS. 11 A and 11 B. These holding plates can be adapted in their length to a curve along the attachment part 21 on the vehicle body.

However, instead of a specially shaped holding plate, it is also possible to use several mechanical holding parts, for instance in the form of clamps having a cross section which also has the shape shown in FIG. 8 in the region of the place of attachment 19.

The holding part 18 can be connected to the air bag unit 22 in the manner shown, for example, in FIGS. 9 and 10. The holding part 18 can be pressed by means of clamp engagement 38 onto the sewing fold 13 to which the longitudinal edges 11 and 12 of the outer fabric of the air bag are sewn. However, it is also possible to sew the end of the holding part 18 connected to the sewing fold 13 to the longitudinal edges 11 and 12 of the air bag outer fabric. Furthermore, as shown in FIG. 9, the end of the holding part 18 to be connected with the sewing fold can be embedded in the plastic material of the sewing fold 13 (FIG. 9). The thread which forms the seams is then passed through corresponding openings in the holding part 18.

The air bag unit 22 can be provided with an additional covering 32. For additional support of the air bag unit 22 on the body of the vehicle, a support 26 can be provided on the clamping device which holds the air bag unit 22, surrounded by the additional covering 32, in the desired position on the part of the vehicle body.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An air bag device for a motor vehicle comprising:
   an air bag capable of being inflated with gas, the air bag in a folded condition extending along an upper door-frame part of the vehicle;
   at least one gas generator for producing inflation gas to inflate the air bag;
   a clamping device holding the air bag to the upper door-frame part;
   a tube disposed inside the air bag by which the inflation gas is distributed, the tube being adapted to the shape of the door-frame part and connected to the at least one gas generator, and wherein the tube includes a projection alone its length which extends in a longitudinal direction of the tube; and
   a plurality of notches in the tube through which the inflation gas flows into the air bag when a predetermined pressure of the inflation gas prevails inside the tube.

2. An air bag device for a motor vehicle comprising:
   at least one air bag capable of being inflated with gas, the air bag having an elongated shape and extending along an upper door-frame part of a body of the vehicle;
   at least one gas generator for inflation of the air bag;
   a clamping device holding the air bag to the upper door-frame part, the clamping device being attached to the upper door-frame part;
   a tube disposed inside the air bag and connected to the gas generator by which the air bag is inflated, wherein the tube includes a projection along its length which extends in a longitudinal direction of the tube; and
   a plurality of areas in the tube which open into the air bag when a predetermined pressure of inflation gas prevails inside the tube.

3. An air bag unit for a motor vehicle comprising:
   an air bag capable of being inflated with gas, the air bag in a folded condition extending in an elongated curve adapted to follow a curve of an upper door-frame part of the vehicle; and
   a tube disposed inside the air bag by which the inflation gas is distributed from a gas generator, wherein the tube is curved to adapt to the curved shape of the door-frame part and the tube includes a projection along its length which extends in a longitudinal direction of the tube.

4. The air bag unit according to claim 3 further comprising a plurality of notches in the tube through which the inflation gas flows into the air bag when a predetermined pressure of the inflation gas prevails inside the tube.

5. The air bag unit according to claim 3 further comprising a plurality of areas in the tube which open into the air bag when a predetermined pressure of inflation gas prevails inside the tube, wherein each area is defined by a notch extending in length along the length of the tube.

6. The air bag unit according to claim 3 wherein the air bag in its folded condition includes a plurality of folds substantially parallel to the projection.

7. The air bag unit according to claim 6 wherein the plurality of folds are positioned along one side of the projection.

8. The air bag unit according to claim 3 wherein the air bag includes longitudinal edges attached to the projection of the tube.

9. The air bag unit according to claim 3 wherein the projection is attached to a clamping device for attachment to the upper door-frame part.

10. An air bag device for a motor vehicle comprising:
   an air bag capable of being inflated with gas, the air bag in a folded condition extending along a curved upper door-frame part of the vehicle;
   at least one gas generator for producing inflation gas to inflate the air bag;
   a clamping device fixedly attaching substantially the complete length of the air bag to the upper door-frame part;
   a tube disposed inside the air bag by which the inflation gas is distributed, wherein the tube is curved to follow the curved shape of said door-frame part, and the tube is connected to the at least one gas generator, and wherein the at least one gas generator comprises first and second gas generators, each of said generators connected to an opposite end of the tube; and electrical feed lines to the first and second gas generators, wherein the feed lines are embedded in the tube.

11. An air bag device for a motor vehicle comprising:

an air bag capable of being inflated with gas, the air bag in a folded condition extending along a curved upper door-frame part of the vehicle;

at least one gas generator for producing inflation gas to inflate the air bag;

a clamping device fixedly attaching substantially the complete length of the air bag to the upper door-frame part;

a tube disposed inside the air bag by which the inflation gas is distributed, wherein the tube is curved to follow the curved shape of said door-frame part, and the tube is connected to the at least one gas generator; and a length of high tear strength material attached to the air bag and attached to the door-frame part, wherein an end of the length of high tear strength material forward of the air bag is attached to a pillar in the door-frame part forward of the air bag.

* * * * *

UNITED STATES PATENT AND TRADEMARK OFFICE
CERTIFICATE OF CORRECTION

PATENT NO. : 5,938,233
DATED : August 17, 1999
INVENTOR(S) : Specht

It is certified that error appears in the above-indentified patent and that said Letters Patent is hereby corrected as shown below:

Column 6, line 3, Claim 1, please delete "alone" and insert --along--.

Signed and Sealed this

Third Day of April, 2001

Attest:

NICHOLAS P. GODICI

Attesting Officer    Acting Director of the United States Patent and Trademark Office